US008549125B2

(12) United States Patent
Hamilton, II et al.

(10) Patent No.: US 8,549,125 B2
(45) Date of Patent: Oct. 1, 2013

(54) ENVIRONMENTALLY SUSTAINABLE COMPUTING IN A DISTRIBUTED COMPUTER NETWORK

(75) Inventors: Rick A. Hamilton, II, Charlottesville, VA (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 12/721,733

(22) Filed: Mar. 11, 2010

(65) Prior Publication Data

US 2011/0225276 A1 Sep. 15, 2011

(51) Int. Cl.
*G06F 15/173* (2006.01)
(52) U.S. Cl.
USPC .............................. 709/223; 709/201; 718/1
(58) Field of Classification Search
USPC ..................................... 709/201, 223; 718/1
See application file for complete search history.

(56) References Cited

U.S. PATENT DOCUMENTS

| 7,093,004 | B2 | 8/2006 | Bernardin et al. | |
|---|---|---|---|---|
| 7,143,134 | B2 | 11/2006 | Petrie et al. | |
| 2006/0089997 | A1* | 4/2006 | Inokuchi | 709/228 |
| 2008/0134258 | A1 | 6/2008 | Goose et al. | |
| 2008/0222024 | A1* | 9/2008 | Fellenstein et al. | 705/37 |
| 2009/0083390 | A1* | 3/2009 | Abu-Ghazaleh et al. | 709/209 |
| 2009/0192981 | A1* | 7/2009 | Papaemmanouil et al. | 707/2 |
| 2011/0066687 | A1* | 3/2011 | Chen et al. | 709/206 |
| 2011/0126197 | A1* | 5/2011 | Larsen et al. | 718/1 |
| 2011/0126275 | A1* | 5/2011 | Anderson et al. | 726/8 |

OTHER PUBLICATIONS

Prithviraj Dasgupta, Adaptive Sharing of Large Resources in P2P Networks, AAMAS, pp. 839-845, Jul. 25-29, 2005, Netherlands.
pcmag.com, [online]; [retrieved on Jan. 7, 2010]; retrieved from the Internet http://www.pcmag.com/print_article2/0,1217,a%253D201656,00.asp Bryan Gardiner, "How Important Will New Energy Star Be for PC Makers", pcmag.com, Feb. 22, 2007, 3p.
Federal Computer Week, [online]; [retrieved on Jan. 7, 2010]; retrieved from the Internet http://fcw.com/Articles/2007/11/19/Measuring-green.aspx?p=1 Mary Mosquera, Measuring Green, Federal Computer Week, Nov. 19, 2007, 4p.
Egemen Tanin, Remote Access to Large Spatial Databases, GIS '02, pp. 5-10, Nov. 8-9, 2002, Virginia, USA.
Joon S. Park et al., Role-Based Access Control for Collaborative Enterprise in Peer-to-Peer Computing Environments, SACMAT '03, pp. 93-99, Jun. 2-3, 2003, Como, Italy.

* cited by examiner

*Primary Examiner* — David Lazaro
*Assistant Examiner* — Marie Georges Henry
(74) *Attorney, Agent, or Firm* — Cantor Colburn LLP; William Stock

(57) ABSTRACT

Implementation of environmentally sustainable computing in a distributed computer network is provided. A method includes receiving a request from a node in the network to perform a computational task and identifying nodes in the network having resources to facilitate performance of the task. Using an environmental impact rating for each of the identified nodes, selecting one or more transmission paths in the network and/or at least one of the identified nodes to facilitate performance of the task based on corresponding environmental impact ratings and applied performance efficiency criteria. Selected identified nodes represent those having the lowest environmental impact rating while meeting the applied performance efficiency criteria. The method further includes executing the task on the node via the transmission paths and/or selected identified nodes.

25 Claims, 4 Drawing Sheets

ENVIRONMENTALLY SUSTAINABLE COMPUTING IN A DISTRIBUTED COMPUTER NETWORK

BACKGROUND

The present invention relates to distributed computing and, more specifically, to environmentally sustainable computing in a distributed computer network.

Environmentally responsible computing (also known as "green IT") has been defined as the design, manufacture, use, and disposal of information technology (IT)-related devices and services (e.g., computers, servers, and subsystems such as monitors, printers, and storage devices, as well as associated network and communications systems) using mechanisms that are determined to incur the least amount impact on the environment; that is, a reduced or minimized 'carbon footprint.' Green IT is also known to focus on finding ways to balance economic viability and efficient system performance with social and ethical responsibilities.

In terms of moving toward environmentally responsible usage of computer systems and network services, some organizations have adopted standards that provide guidance in terms of measures one may employ to minimize the environmental impact of IT-related systems and activities (e.g., measures that will reduce energy consumption). While such standards and practices may be useful in some types of applications and computer networks (e.g., pre-configured networks, such as those in which there exist a priori knowledge of the structure of the system/network (e.g., network topology, network latency, and number of computers)), they do not readily address distributed networks which may lack a persistent structure (e.g., peer-to-peer networks). A distributed network architecture may be defined as a system in which multiple autonomous computers (nodes) communicate through a network with one another to achieve a common goal or to solve complex computational problems. In a distributed computer network, a problem may be divided into multiple smaller tasks, each of which is processed or solved by a computer in the network.

Nodes or computers within a peer-to-peer (P2P) network typically lack knowledge of the structure of the network topology. For example, the P2P network may consist of many different computers and network links and, by its nature, the system may be subject to change during execution of various computational tasks performed therein. Further, each computer or node in the network may have only a limited view of the network itself, as well as other computers/nodes on the network. Cloud computing networks (e.g., grid systems) are another such example of a distributed network architecture. In current distributed computer networks that utilize cooperative computational services (e.g., peer-to-peer networks, cloud computing networks), there is no mechanism that allows for blending or balance of cooperative computational requests between network nodes and services of varying degrees of environmental impact.

What is needed, therefore, is way to enable users of cooperative computational services to specify a balance between computational task completion and environmental impact for the task.

SUMMARY

According to one embodiment of the present invention, a method for implementing environmentally sustainable computing in a distributed computer network is provided. The method includes receiving a request from a node in the network to perform a computational task and identifying nodes in the network having resources to facilitate performance of the task. Using an environmental impact rating for each of the identified nodes, selecting one or more transmission paths in the network and/or at least one of the identified nodes to facilitate performance of the task based on corresponding environmental impact ratings and applied performance efficiency criteria. Selected identified nodes represent those having the lowest environmental impact rating while meeting the applied performance efficiency criteria. The method further includes executing the task on the node via the transmission paths and/or selected identified nodes.

According to another embodiment of the present invention, a system for implementing environmentally sustainable computing in a distributed computer network is provided. The system includes a computer processing device. The system also includes a control system executing on the computer processing device. The control system implements a method. The method includes receiving a request from a node in the network to perform a computational task and identifying nodes in the network having resources to facilitate performance of the task. Using an environmental impact rating for each of the identified nodes, selecting one or more transmission paths in the network and/or at least one of the identified nodes to facilitate performance of the task based on corresponding environmental impact ratings and applied performance efficiency criteria. Selected identified nodes represent those having the lowest environmental impact rating while meeting the applied performance efficiency criteria. The method further includes executing the task on the node via the transmission paths and/or selected identified nodes.

According to a further embodiment of the present invention, a computer program product for implementing environmentally sustainable computing in a distributed computer network is provided. The computer program product includes a computer-readable storage medium having program code embodied thereon, which when executed by a computer processing device, cause the computer processing device to implement a method. The method includes receiving a request from a node in the network to perform a computational task and identifying nodes in the network having resources to facilitate performance of the task. Using an environmental impact rating for each of the identified nodes, selecting one or more transmission paths in the network and/or at least one of the identified nodes to facilitate performance of the task based on corresponding environmental impact ratings and applied performance efficiency criteria. Selected identified nodes represent those having the lowest environmental impact rating while meeting the applied performance efficiency criteria. The method further includes executing the task on the node via the transmission paths and/or selected identified nodes.

According to yet a further embodiment of the present invention, a method for implementing environmentally sustainable computing in a distributed computer network is provided. The method includes searching the distributed computer network for active nodes and determining an environmental impact of discovered nodes in the distributed computer network. For discovered nodes determined to have an environmental impact within a pre-defined range, the method includes sharing resources with the discovered nodes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide a distributed network management system and services that enable users of cooperative computational services to specify a balance between computational task completion and environmental impact for the task. The same principals may also be applied in a cloud computing environment or similar network architectures. Balancing techniques may be implemented as a setting within an individual application or a setting within a meta-service access by applications over the network.

Figure 1:
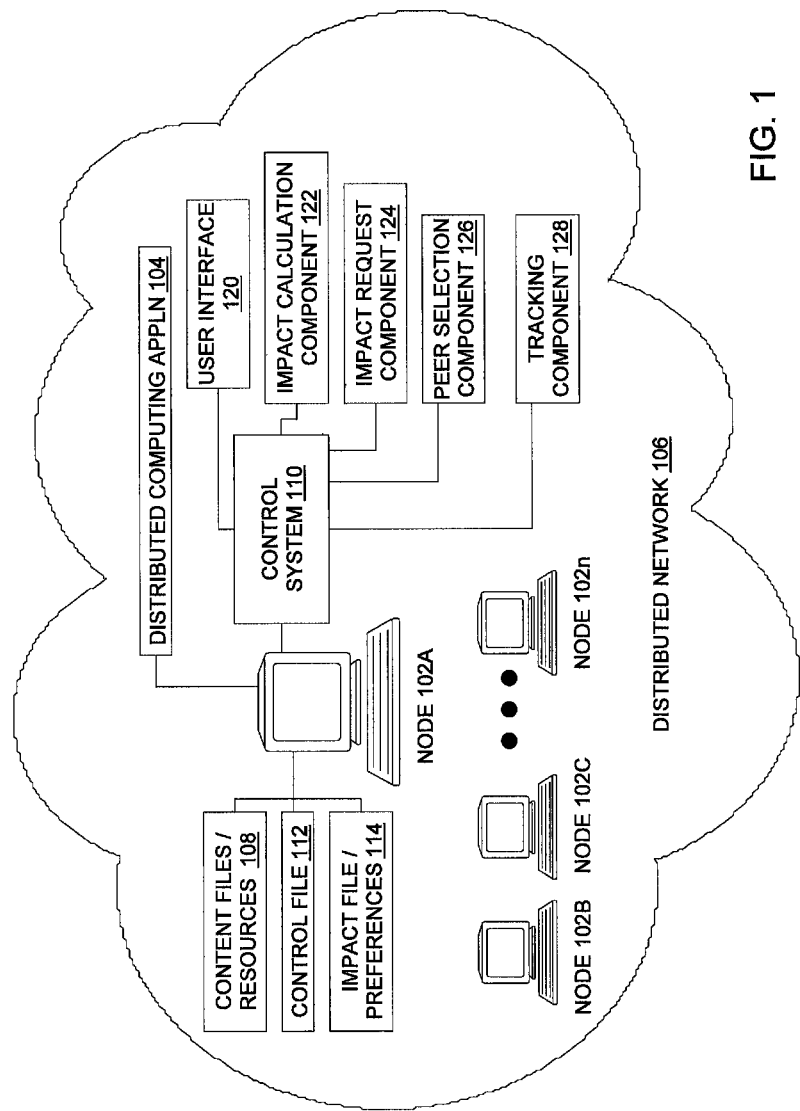
FIG. 1 depicts a block diagram of a system upon which distributed network management services may be implemented in an exemplary embodiment.

With reference now to FIG. 1, an exemplary system upon which the distributed network management services may be implemented will now be described. By way of example, a peer-to-peer (P2P) network is employed as the distributed network architecture implementing the services described herein. Network 106 includes nodes 102A-102n, which communicate with one another via ad hoc connections. Nodes 102A-102n may be implemented as computer devices, such as general-purpose or personal computers that include e.g., desktop computers, laptops, personal digital assistants, etc. The nodes 102A-102n act as peers within the network 106 by supplying and/or consuming information/resources amongst one another via the ad hoc connections (e.g., using protocols such as BitTorrent).

As shown in FIG. 1, node 102A executes a distributed computing application 104 and a control system 110. For ease of illustration, FIG. 1 depicts the application 104 and control system 110 in relation to node 102A only; however, it will be understood that any number of the nodes 102A-102n in the network 106 may implement the distributed computing application 104 and control system 110. The distributed computing application 104 enables peer discovery of other nodes in the network 106 and may be facilitated, e.g., using an application layer overlay network that resides on top of a physical network (e.g., Internet).

In an exemplary embodiment, control system 110 facilitates the distributed network management services described herein. In the exemplary embodiment shown in FIG. 1, the control system 110 includes a user interface 120, an impact calculation component 122, an impact request component 124, a peer selection component 126, and a tracking component 128. While shown as separate elements, it will be understood that the user interface 120 and one or more of the components 122-128 may be implemented as an integrated subsystem of the control system 110. In another exemplary embodiment, the control system 110 may be integrated with the distributed computing application 104 to provide both distributed network node discovery as well as the exemplary distributed computer network services. The control system 110 is described further herein.

In an exemplary embodiment, node 102A includes resources 108, a control file 112, and an impact file and preferences 114. It will be understood that other nodes (e.g., 102B-102n) may also include resources 108, control files 112, and impact files and preferences 114 in order to realize the advantages of the exemplary embodiments. Resources 108 may include any capability of the node that may be shared among other nodes in the network 106. For example, resources 108 may include processes implemented by hardware or peripheral components of the node (e.g., CPU processing, storage access in memory, printing, etc). In one exemplary embodiment, resources may include content files. Content files may include any type of media file, e.g., audio, video, data, multi-media.

Control file 112 includes information about the node's shared resources and node control system information. For example, in a P2P distributed network where content files represent the resources to be shared, the control file 112 may include file ownership information with respect to the node which owns the file to be shared. The control file 112 may be registered with a tracker system, which in turn coordinates distribution of files to be shared. The tracker system is implemented by the tracking component 128 of the control system 110. The tracker system may maintain a list of clients (nodes) currently participating in the P2P network. The tracker system may further index control files registered therein. The control file 112 may include metadata about the file (resource), a uniform resource locator (URL) of the tracker system, the size of the control file 112, and a hash code for each piece of the file. As understood by those skilled in the art, file sharing may be implemented by the transmission of various segments of the file, each of the segments typically distributed by a different node in the network using a hashing function (e.g., a distributed has table controlled by the tracker system).

The impact file and preferences 114 are described further herein.

As indicated above, the control system 110 includes user interface 120, impact calculation component 122, impact request component 124, peer selection component 126, and tracking component 128. The user interface 120 of the control system 110 is configured to enable a user of one or more nodes 102A-102n to view current environmental impact values associated with peer nodes on the network 106, initiate a request for a resource (e.g., a content file), select or view performance efficiency criteria, and access nodes in the network identified as meeting various performance efficiency criteria in view of corresponding environmental impact values. Environmental impact values associated with a node are collectively referred to herein as an environmental impact rating. Performance efficiency criteria are described further herein. A sample user interface 400 is shown and described in FIG. 4.

In an exemplary embodiment, the impact calculation component 122 calculates an environmental impact rating for each node in the network 106 that is identified as having one or more resources to facilitate implementation of a request provided by one of the nodes in the network 106. In an exemplary embodiment, the environmental impact rating is calculated by assessing a number of characteristics pertaining to a node and applying pre-defined rules to these characteristics. Characteristics utilized in the assessment provide information or insight relating to the capabilities and constraints of the node which are known or believed to have an environmental impact. Characteristics may include fixed aspects of the node, such as manufacturer specifications (e.g., maximum processing speed, maximum storage capacity, product materials, model number, model year, etc.), agency-assigned environmental impact values (e.g., studies conducted by environmental or government groups), and government- or entity-imposed regulations on environmental procedures implemented with respect to the node or the node's environment (e.g., recycling procedures, disposal plans, environmentally sound node management plans, such as self-imposed restrictions on power consumption, etc.). Dynamic characteristics associated with the node may include current routing connections identified for the node (i.e., characteristics of the communications path(s) that may result in transmission latency), values reflecting currently executing processes (e.g., processes affecting bandwidth availability), current storage capacity, etc.

As indicated above, pre-defined rules are applied to one or more of these characteristics to derive an environmental impact value. The rules may be implemented using mathematical algorithms that consider the extent of environmental impact associated with one or more characteristics and applying a weighting mechanism to those characteristics having a greater impact, such that an overall environmental impact rating provides a standardized value representing the collective characteristics factoring in corresponding impact weights.

The impact request component 124 may utilize the impact calculation component 122 to request and receive environmental impact ratings calculated by the impact calculation component. In one exemplary embodiment, each node 102A-102n is responsible for calculating its own environmental impact rating (e.g., using the environmental calculation component 122) and provides its environmental impact rating to the impact request component 124 upon request from the distributed computer network 106. Alternatively, or in addition thereto, a node may provide its environmental impact rating upon its addition as a new node in the network 106 or upon updating its environmental impact rating in response to a change occurring with respect to the node (e.g., updated hardware, software, processors, etc.).

The distributed computer network 106, e.g., via a control system 110, may select from one or more peer nodes in the network 106 for implementation of the requested task based upon those nodes having the lowest environmental impact rating or in response to application of performance efficiency criteria to the candidate nodes (i.e., those identified as having the resources to facilitate the requesting task). By applying the performance efficiency criteria to the candidate nodes, the distributed computer network management services enable selection of peer nodes based not only on their environmental impact ratings, but also based on a desired balance between the environmental impact resulting from task execution and the quality of the task completion. This balancing function is described further with respect to FIG. 2.

The tracking component 128 is described above with respect to the control file 112.

Figure 2:
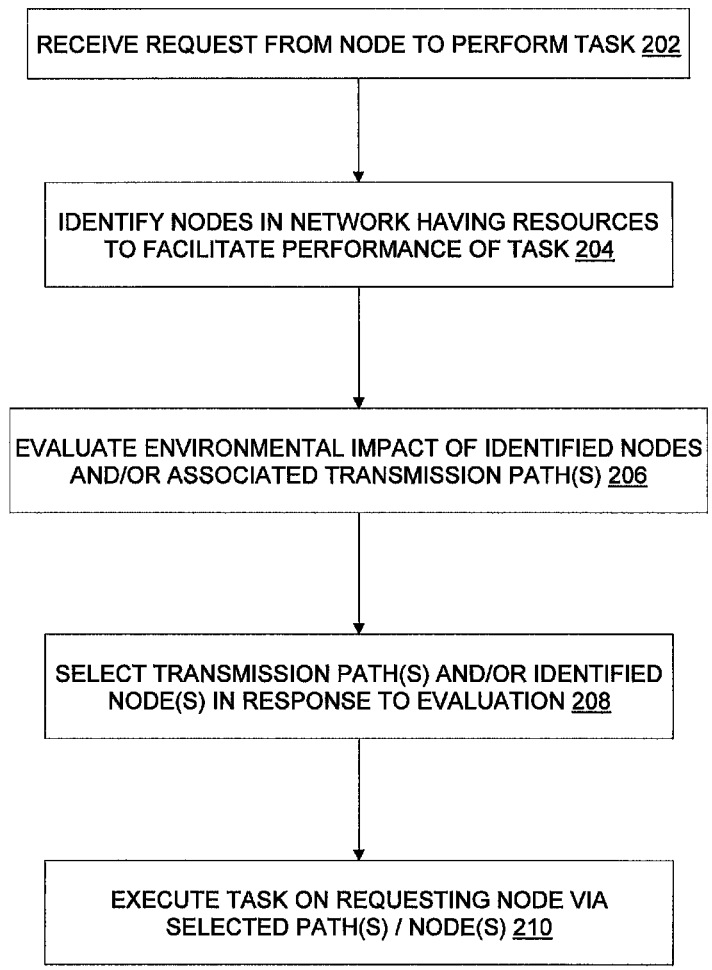
FIG. 2 illustrates a flow diagram describing a process for implementing the distributed network management services in an exemplary embodiment.

The distributed network management services provide the ability to perform computational task execution that entails the selection of network nodes (and optionally, transmission paths) in the network in a manner that balances the environmental impact of task execution with the quality of the computational task execution. Turning now to FIG. 2, an exemplary process for implementing the distributed network management services will now be described. For purposes of illustration, and by way of non-limiting example, the distributed network management processes described in FIG. 2 relate to a P2P network, the computational tasks relate to file sharing among nodes in the P2P network, and a request for a resource relates to a node requesting a file from other nodes on the network 106.

At step 202, the distributed computer network 106 receives a request (e.g., via control system 110) from a node in the distributed computer network 106 to perform a computational task. In one exemplary embodiment, the request is to download a file (e.g., content file 108) from one or more nodes 102 in the network 106.

At step 204, the control system 110 identifies nodes in the distributed computer network 106 having the resources (e.g., file segments) to facilitate performance of the task. Nodes that are active in the network 106 may be discovered, e.g., via the distributed computing application 104 or similar means. Among the active nodes, those nodes having the requested resources may be identified using various techniques depending upon the network configuration. For example, in a P2P network the requesting node 102 may connect to the tracking component 128 associated with the file of interest. The tracking component 128 identifies a list of peer nodes currently transferring segments of the file. Once the peer nodes are selected for facilitating the task execution (see step 208), the requesting node may then connect to the identified nodes to obtain the file segments for download. In one exemplary embodiment, facilitating performance of the requested task includes receiving notification that a node in the distributed computer network 106 has an available file segment (resource).

At step 206, the control system 110 (e.g., via the impact calculation component 122) evaluates an environmental impact for each of the identified nodes and/or transmission paths, whereby a highest impact rating represents a maximum environmental impact and a lowest impact rating represents a minimum environmental impact. As indicated above, the environmental impact may be determined by acquiring characteristics of the identified nodes, and applying a set of rules to the characteristics, the characteristics specifying capabilities and constraints of the identified nodes and related transmission paths. An environmental impact rating for each identified node is derived in response to calculating the environmental impact. As indicated above, each node in the distributed computer network may be directed to calculate its own environmental impact rating, e.g., via the impact calculation component 122, and may provide its environmental impact rating to the distributed computer network 106 upon a request for the rating (e.g., via the impact request component 124), upon becoming newly added to the distributed computer network 106, and/or upon updating its current environmental impact rating. The environmental impact rating for each node may be stored in an impact file 114 stored locally on a corresponding node 102. Upon a request from the distributed computer network 106, the control system 110 of the node may retrieve the environmental impact rating from the impact file 114 and transmit the rating to the network 106.

At step 208, the control system 110 selects at least one of the identified nodes (and optionally, one or more transmission paths) to facilitate performance of the task based on the corresponding environmental impact values and applied performance efficiency criteria. The selected identified nodes may represent those having the lowest environmental impact rating while meeting the applied performance efficiency criteria.

At step 210, the task is executed via the selected node(s). For example, in a file sharing scenario, segments of the desired file may be downloaded from the selected nodes.

In an exemplary embodiment, the distributed network management services may be configured to enable, either before or during task execution, modifications to the selected nodes/transmission paths based upon changes occurring within the network 106. In one exemplary embodiment, the distributed network management services re-iteratively: re-calculate environmental impact ratings for nodes in the distributed computer network, re-evaluate selection of the identified (selected) node and/or transmission path based upon results of the re-calculations, and modify selections (e.g., select new/different peer nodes) to accommodate changes in the dynamic aspects of the identified nodes.

Figure 4:
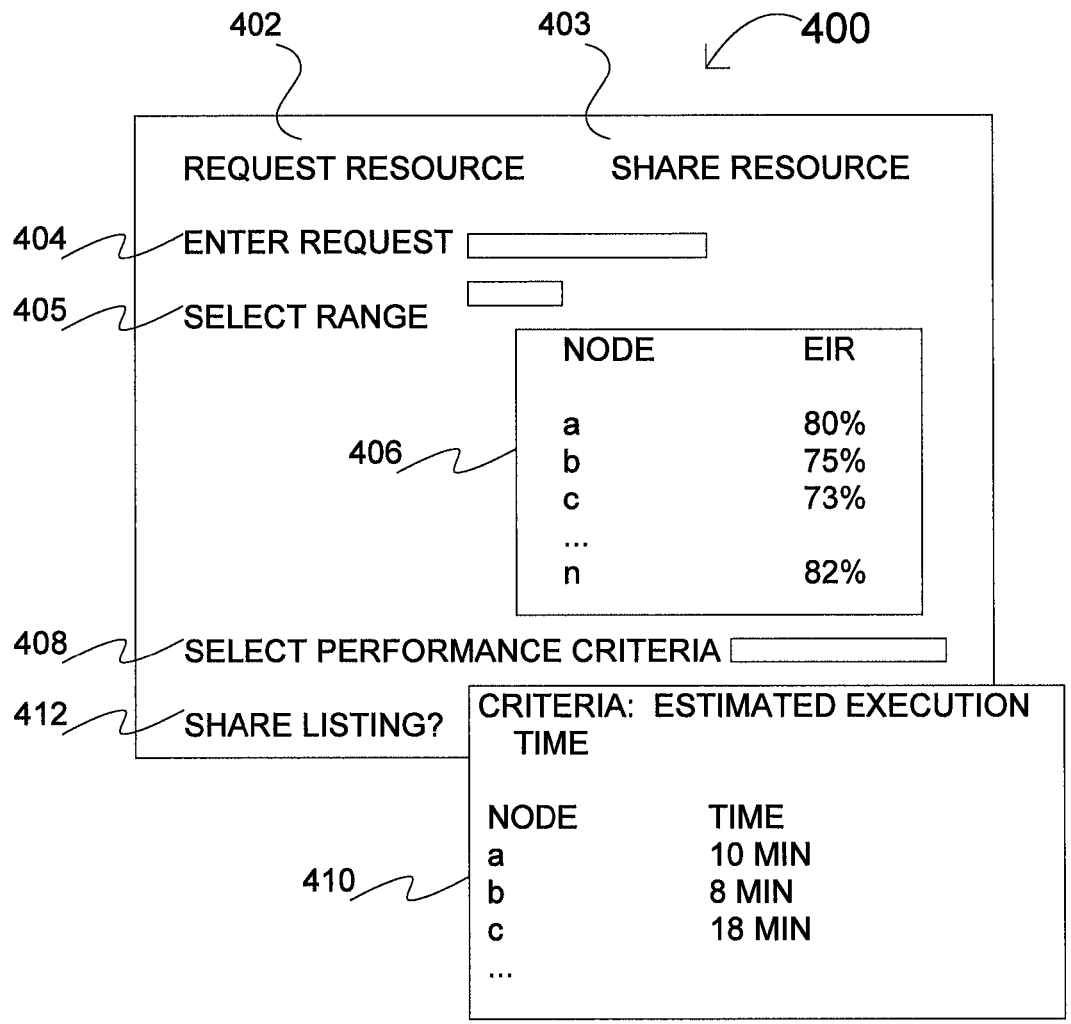
FIG. 4 depicts a sample computer screen window of a user interface provided by the distributed network management services in an exemplary embodiment.

Turning now to FIG. 4, a computer screen window 400 of the user interface 120 provided by the distributed network management services will now be described in an exemplary embodiment. As indicated above, the user interface 120 of the control system 110 is configured to enable a user of one or more nodes 102A-102n to view current environmental impact values associated with peer nodes on the network 106, initiate a request for a resource (e.g., a content file), select or view performance efficiency criteria, and access nodes in the network identified as meeting various performance efficiency criteria in view of corresponding environmental impact values.

As shown in FIG. 4, a user at one of nodes 102A-102n may request a resource (task) by selecting REQUEST RESOURCE 402 and entering information about the request in field 404. The nodes discovered and identified as capable of facilitating execution of the task are presented in a subwindow 406 (e.g., nodes a-n), along with their environmental impact ratings. Optionally, subwindow 406 may also include performance data concerning one or more transmission paths associated with the identified nodes (not shown). The user desires to apply performance efficiency criteria to the nodes in subwindow 406, the user selects the option 408 and a subwindow 410 appears. The subwindow 410 may list one or more characteristics of the nodes (current processing capability is shown for illustration) along with an associated value calculated by the impact calculation component 122. The user may view these values for each of the nodes (e.g., nodes a-n) in the subwindow 410 and select from the list according to the desired performance qualities. For example, suppose the user desires to utilize identified nodes having an impact rating no greater than 75%, and which is capable of executing the task within a specific time period. As shown in FIG. 4, node c is rated as 73% indicating its environmental impact is less than that of node b, which is rated 75%. Thus, node c, having a lesser environmental impact, appears to be the best candidate for selection. However, the selected performance efficiency criteria in subwindow 410 indicate that node c is estimated to require more than twice as long as node b to execute the task. In an effort to balance the costs and benefits of the two nodes b and c, the user may determine that the 2% difference in impact rating is not worth the cost of the latency involved in executing the task. In this manner, the user may select the node having a slighter greater environmental impact.

Figure 3:
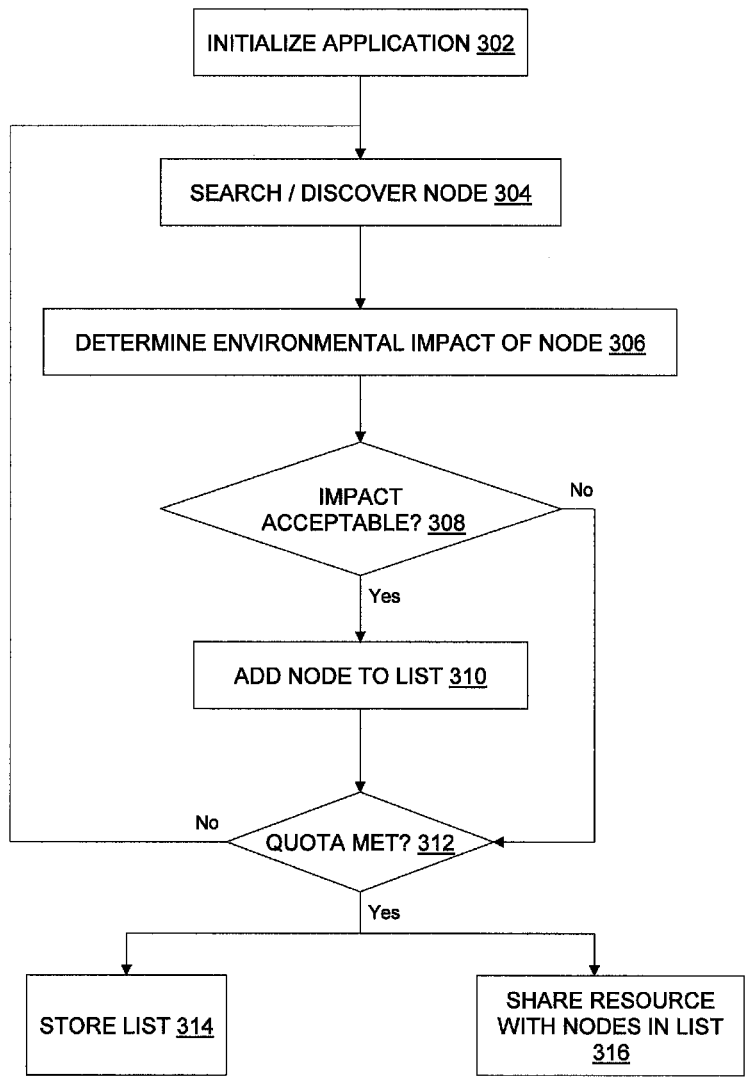
FIG. 3 illustrates a flow diagram describing a process for implementing the distributed network management services in another exemplary embodiment.

As shown in FIG. 4, a user of one of nodes 102A-102n may utilize the distributed network management services to share its resources (e.g., file sharing) with other nodes in the network 106. This option may be initiated by selecting SHARE RESOURCE 403 on the computer screen window 400. Turning now to FIGS. 3 and 4 an exemplary process for sharing resources using the distributed network management services will now be described in an exemplary embodiment.

At step 302, the node desiring to share its resources (e.g., a content file or file segment) initializes the application 104 and control system 110 and searches the distributed computer network (e.g., via application 104) for active nodes at step 304.

At step 306, the control system 110 (e.g., via the impact calculation component 122) determines an environmental impact of a discovered node in the distributed computer network 106. This may be implemented in a similar manner as that described above in FIG. 2. The user may specify preferences with respect to nodes that are permitted to request and receive the shared resources. For example, as shown in FIG. 4, the user may select the option SELECT RANGE 405, which then prompts the user to enter a desired range for environmental impact ratings associated with nodes that will be permitted to request and receive the shared resources. In response to entering this range, the control system 110 determines whether the identified node has a rating that falls within the established range. If the range requirement is met at step 308, the identified node is added to a list at step 310. The identified node and its rating may be displayed to the user via, e.g., the subwindow 406 of FIG. 4. The control system 110 may continue to search and discover nodes until a specified quota of nodes having impact ratings within the desired range is met. At step 312, the control system 110 determines if the quota has been met in response to adding the node to the list at step 310, or alternatively, in response to determining the impact rating of the discovered node is not acceptable at step 308.

If the desired quota has been met, the list is stored at step 314 and the resource becomes available to the node in the list at step 316. The user may decide whether to store the list via an option SAVE LISTING 412 in FIG. 4. If the quota has not been met at step 312, the process returns to step 304 whereby the control system 110 and application 104 continue to search for nodes.

In an exemplary embodiment, when the user re-connects to the distributed computer network 106, the control system 110 accesses the list and attempts to re-connect with the nodes in the list. The control system 110 may re-evaluate the environmental impact rating of the nodes discovered as a result of the re-connection, in order to determine whether these nodes having ratings that are still within the acceptable range. For those nodes in which the ratings still fall within the acceptable range, the control system 110 permits the nodes to access the resource provided by the sharing node.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the preferred embodiment to the invention has been described, it will be understood that those skilled in the art, both now and in the future, may make various improvements and enhancements which fall within the scope of the claims that follow. These claims should be construed to maintain the proper protection for the invention first described.

What is claimed is:

1. A method for implementing environmentally sustainable computing in a distributed computer network, the method comprising:
   receiving a request from a node in the distributed computer network to perform a computational task;
   identifying nodes in the distributed computer network having resources to facilitate performance of the task;
   calculating an environmental impact rating for each of the identified nodes by acquiring characteristics of the identified nodes, and applying a set of rules to the characteristics, the characteristics including regulations on environmental procedures implemented with respect to the identified nodes, the regulations including self-imposed restrictions on power consumption and at least one of: recycling procedures and node disposal plans; and
   using the environmental impact rating for each of the identified nodes, whereby a highest impact rating represents a maximum environmental impact and a lowest impact rating represents a minimum environmental impact:
   selecting at least one of a transmission path in the distributed computer network and at least one of the identified nodes to facilitate performance of the task based on corresponding environmental impact ratings and applied performance efficiency criteria, wherein selected identified nodes represent those having the lowest environmental impact rating while meeting the applied performance efficiency criteria; and
   executing the task on the node via the at least one of a selected transmission path and at least one of a selected node from the identified nodes.

2. The method of claim 1, wherein:
   the distributed computer network is a peer-to-peer network;
   the task comprises downloading a content file;
   the identifying nodes having resources to facilitate performance of the task is implemented by node discovery and control file access of discovered nodes, the control file access specifying the resources; and
   the resources comprise segments of the file.

3. The method of claim 1, wherein the characteristics specify capabilities and constraints of the identified nodes and related transmission paths;
   wherein the characteristics include fixed aspects of the identified nodes including at least one of manufacturing specifications, agency-assigned environmental impact values, and entity-imposed regulations on environmental procedures implemented with respect to nodes; and
   wherein the characteristics further include dynamic aspects of the identified nodes including at least one of current routing connections identified for a node, values specifying currently executing processes, and current storage capacity.

4. The method of claim 3, wherein each node in the distributed computer network calculates its own environmental impact rating, and provides its environmental impact rating to the distributed computer network upon at least one of: becoming newly added to the distributed computer network, updating its current environmental impact rating, and a request for the environmental impact rating.

5. The method of claim 1, further comprising, iteratively:
   re-calculating environmental impact ratings for nodes in the distributed computer network;
   re-evaluating selection of the at least one transmission path and the at least one identified node based upon the re-calculating; and
   modifying selections to accommodate changes in the dynamic aspects of the identified nodes.

6. The method of claim 1, wherein facilitating performance of the task comprises receiving notification that a node in the distributed computer network has an available resource based on the request.

7. The method of claim 1, further comprising at least one of:
   presenting the environmental impact ratings of each of the identified nodes via a user interface displayed on the node and configuring the user interface to enable a user of the node to select at least one of the identified nodes and at least one transmission path; and
   presenting performance efficiency criteria via a user interface displayed on the node and configuring the user interface to enable a user of the node to select from the performance efficiency criteria, the performance efficiency criteria including time duration of task execution and quality of task execution.

8. A system for implementing environmentally sustainable computing in a distributed computer network, the system comprising:
   a computer processing device; and
   a control system executing on the computer processing device, the control system implementing a method, the method comprising:
   receiving a request to perform a computational task;
   identifying nodes in the distributed computer network having resources to facilitate performance of the task;

calculating an environmental impact rating for each of the identified nodes by acquiring characteristics of the identified nodes, and applying a set of rules to the characteristics, the characteristics including regulations on environmental procedures implemented with respect to the identified nodes, the regulations including self-imposed restrictions on power consumption and at least one of: recycling procedures and node disposal plans; and using the environmental impact rating for each of the identified nodes, whereby a highest impact rating represents a maximum environmental impact and a lowest impact rating represents a minimum environmental impact:

selecting at least one of a transmission path in the distributed computer network and at least one of the identified nodes to facilitate performance of the task based on corresponding environmental impact ratings and applied performance efficiency criteria, wherein selected identified nodes represent those having the lowest environmental impact rating while meeting the applied performance efficiency criteria; and executing the task on the computer processing device via the at least one of a selected transmission path and at least one of a selected node from the identified nodes.

9. The system of claim 8, wherein:
the distributed computer network is a peer-to-peer network;
the task comprises downloading a content file;
the identifying nodes having resources to facilitate performance of the task is implemented by node discovery and control file access of discovered nodes, the control file access specifying the resources; and
the resources comprise segments of the file.

10. The system of claim 8, wherein the characteristics specify capabilities and constraints of the identified nodes and related transmission paths;
wherein the characteristics include fixed aspects of the identified nodes including at least one of manufacturing specifications, agency-assigned environmental impact values, and entity-imposed regulations on environmental procedures implemented with respect to nodes; and
wherein the characteristics further include dynamic aspects of the identified nodes including at least one of current routing connections identified for a node, values specifying currently executing processes, and current storage capacity.

11. The system of claim 10, wherein the computer processing device calculates its own environmental impact rating via the control system, and provides its environmental impact rating to the distributed computer network upon at least one of: becoming newly added to the distributed computer network, updating its current environmental impact rating, and a request for the environmental impact rating.

12. The system of claim 8, wherein the control system further performs, iteratively:
re-calculating environmental impact ratings for nodes in the distributed computer network;
re-evaluating selection of the at least one transmission path and the at least one identified node based upon the re-calculating; and
modifying selections to accommodate changes in the dynamic aspects of the identified nodes.

13. The system of claim 8, wherein the control system further performs at least one of:
presenting the environmental impact ratings of each of the identified nodes via a user interface displayed on the computer processing device and configuring the user interface to enable a user of the computer processing device to select at least one of the identified nodes and at least one transmission path; and
presenting performance efficiency criteria via a user interface displayed on the computer processing device and configuring the user interface to enable a user of the computer processing device to select from the performance efficiency criteria, the performance efficiency criteria including time duration of task execution and quality of task execution.

14. A computer program product including a non-transitory computer-readable storage medium having program code embodied thereon, the computer program product implementing environmentally sustainable computing in a distributed computer network, the program code including instructions for causing a computer processing device to implement a method, the method comprising:
receiving a request from a node in the distributed computer network to perform a computational task;
identifying nodes in the distributed computer network having resources to facilitate performance of the task;
calculating an environmental impact rating for each of the identified nodes by acquiring characteristics of the identified nodes, and applying a set of rules to the characteristics, the characteristics including regulations on environmental procedures implemented with respect to the identified nodes, the regulations including self-imposed restrictions on power consumption and at least one of: recycling procedures and node disposal plans; and
using the environmental impact rating for each of the identified nodes, whereby a highest impact rating represents a maximum environmental impact and a lowest impact rating represents a minimum environmental impact:
selecting at least one of a transmission path in the distributed computer network and at least one of the identified nodes to facilitate performance of the task based on corresponding environmental impact ratings and applied performance efficiency criteria, wherein selected identified nodes represent those having the lowest environmental impact rating while meeting the applied performance efficiency criteria; and
executing the task on the computer processing device via the at least one of a selected transmission path and at least one of a selected node from the identified nodes.

15. The computer program product of claim 14, wherein:
the distributed computer network is a peer-to-peer network;
the task comprises downloading a content file;
the identifying nodes having resources to facilitate performance of the task is implemented by node discovery and control file access of discovered nodes, the control file access specifying the resources; and
the resources comprise segments of the file.

16. The computer program product of claim 14, wherein the characteristics specify capabilities and constraints of the identified nodes and related transmission paths;
wherein the characteristics include fixed aspects of the identified nodes including at least one of manufacturing specifications, agency-assigned environmental impact values, and entity-imposed regulations on environmental procedures implemented with respect to nodes; and
wherein the characteristics further include dynamic aspects of the identified nodes including at least one of current routing connections identified for a node, values specifying currently executing processes, and current storage capacity.

17. The computer program product of claim 16, wherein the computer processing device in the distributed computer network calculates its own environmental impact rating, and provides its environmental impact rating to the distributed computer network upon at least one of: becoming newly added to the distributed computer network, updating its current environmental impact rating, and a request for the environmental impact rating.

18. The computer program product of claim 14, further comprising instructions for iteratively performing:
   re-calculating environmental impact ratings for nodes in the distributed computer network;
   re-evaluating selection of the at least one transmission path and the at least one identified node based upon the re-calculating; and
   modifying selections to accommodate changes in the dynamic aspects of the identified nodes.

19. The computer program product of claim 14, further comprising instructions for performing at least one of:
   presenting the environmental impact ratings of each of the identified nodes via a user interface displayed on the node and configuring the user interface to enable a user of the node to select at least one of the identified nodes and at least one transmission path; and
   presenting performance efficiency criteria via a user interface displayed on the node and configuring the user interface to enable a user of the node to select from the performance efficiency criteria, the performance efficiency criteria including time duration of task execution and quality of task execution.

20. A method for implementing environmentally sustainable computing in a distributed computer network, comprising:
   searching the distributed computer network for active nodes;
   determining an environmental impact of discovered nodes in the distributed computer network;
   calculating an environmental impact rating for each of the discovered nodes by acquiring characteristics of the discovered nodes, and applying a set of rules to the characteristics, the characteristics including regulations on environmental procedures implemented with respect to the discovered nodes, the regulations including self-imposed restrictions on power consumption and at least one of: recycling procedures and node disposal plans; and
   for discovered nodes determined to have an environmental impact within a pre-defined range specified by the environmental impact rating, sharing resources with the discovered nodes.

21. The method of claim 20, further comprising:
   storing a list of the discovered nodes determined to have an environmental impact within the pre-defined range; and
   upon reconnection to distributed computer network:
   accessing the list;
   attempting to re-connect with the discovered nodes in the list; and
   for those discovered nodes in the list in which a re-connection is successful and upon determining the discovered nodes in the list have an environmental impact maintained in the pre-defined range, sharing resources with the discovered nodes.

22. The method of claim 21, further comprising iteratively searching for active nodes having an environmental impact within the pre-defined range and adding the active nodes to the list until a pre-defined quota of the active nodes has been met.

23. The method of claim 20, further comprising querying nodes for characteristics and performance criteria, wherein determining the environmental impact includes evaluating the characteristics in view of the performance criteria and generating a value representing a level of environmental impact.

24. The method of claim 23, wherein the characteristics include fixed aspects of the identified nodes including at least one of manufacturing specifications, agency-assigned environmental impact values, and entity-imposed regulations on environmental procedures implemented with respect to nodes; and
   wherein the characteristics further include dynamic aspects of the identified nodes including at least one of current routing connections identified for a node, values specifying currently executing processes, and current storage capacity.

25. The method of claim 20, further comprising at least one of:
   presenting the environmental impact ratings of each of the identified nodes via a user interface displayed on the node and configuring the user interface to enable a user of the node to select at least one of the identified nodes and at least one transmission path;
   presenting performance efficiency criteria via a user interface displayed on the node and configuring the user interface to enable a user of the node to select from the performance efficiency criteria, the performance efficiency criteria including time duration of task execution and quality of task execution.

* * * * *